United States Patent [19]

Evans

[11] 4,337,929
[45] Jul. 6, 1982

[54] ROTARY FURNACE FOR MELTING METAL

[75] Inventor: Marvin Evans, Milwaukee, Wis.

[73] Assignee: College Research Corporation, Germantown, Wis.

[21] Appl. No.: 217,769

[22] Filed: Dec. 18, 1980

[51] Int. Cl.³ ............................................... F27B 7/26
[52] U.S. Cl. ...................................... 266/248; 75/24; 75/68 R; 432/111
[58] Field of Search ............... 266/145, 173, 213, 244, 266/248; 75/24, 68 R; 432/103, 111

[56] References Cited

U.S. PATENT DOCUMENTS 2,507,123  5/1950  Sproule et al. .................... 266/173
3,215,421  11/1965  Ankersen ......................... 75/68 R

FOREIGN PATENT DOCUMENTS 715394  9/1931  France ......................... 432/103

Primary Examiner—M. J. Andrews
Attorney, Agent, or Firm—Andrus, Sceales, Starke & Sawall

[57] ABSTRACT

A rotary furnace for recovering metals, such as aluminum. The furnace includes an outer cylindrical, open-ended drum which is mounted for rotation about its axis. Secured within the drum is a tapered kiln and the kiln is spaced inwardly of the drum to provide an annular chamber therebetween. Salt and aluminum dross and skimmings are introduced into the small diameter end of the kiln and heated, and the molten aluminum and salt are separately withdrawn from the large diameter end of the kiln. The construction of the furnace provides precise concentricity for the rotating kiln, thereby reducing bearing loads and the energy requirements for driving the kiln.

10 Claims, 5 Drawing Figures

ROTARY FURNACE FOR MELTING METAL

BACKGROUND OF THE INVENTION

Various types of furnaces have been used in the past to recover aluminum from dross and skimmings. In the conventional aluminum recovery procedure, salt is initially introduced into a rotating furnace or kiln and heated to the molten state. Aluminum dross and skimmings are then added to the furnace and melted. The molten aluminum stratifies as a layer beneath the molten salt, and the salt layer protects the molten aluminum from oxidation. After the materials have been melted, rotation of the furnace is stopped and the molten aluminum is withdrawn from a tap hole in an end of the furnace. After withdrawal of the molten aluminum, the salt is similarly withdrawn from the end of the furnace by gravity.

The conventional aluminum recovery furnace is cylindrical in shape and in order to drain or withdraw the molten aluminum and salt from the furnace, a hydraulically actuated tilt mechanism is employed to tilt the furnace. As the furnace has substantial weight, up to 60,000 lbs. the tilt mechanism is complex and adds considerable cost to the unit.

Other commonly used furnaces have an outer cylindrical drum and a tapered refractory lining. By use of the tapered refractory lining, the molten materials can be drained from the furnace without the necessity of a tilt mechanism.

To rotate the conventional furnace, a pair of guide rings and a gear ring are welded in spaced relation to the outer cylindrical surface of the furnace. As the furnace has a substantial diameter, generally in the range of 8 to 10 ft., it is very difficult to precisely position the guide rings and drive ring on the outer surface of the furnace with the result that a certain amount of eccentricity inherently results. The eccentricity produces a substantial load on the bearings and also increases the energy requirement for rotating the furnace.

As a further disadvantage, the guide rings and gear ring, which are welded to the outer metal shell of the furnace, tend to restrict the thermal expansion of the shell during the heating process. As expansion of certain areas of the metal shell is restricted, the refractory lining in these areas tends to crack and deteriorate, thereby resulting in serious maintenance problems.

SUMMARY OF THE INVENTION

The invention is directed to an improved rotary furnace for recovering metals, and has particular use as a salt-aluminum melting furnace. In accordance with the invention, the furnace includes an outer cylindrical open-ended drum which is mounted for rotation about its axis. Located within the drum is a tapered, refractory lined, kiln, and the kiln is spaced inwardly of the drum to provide an annular chamber therebetween.

The outer drum and attached kiln are rotated by a roller chain which is secured to the outer surface of the drum and is engaged by a drive spocket. The drum is guided in rotation by a pair of guide rings that are welded to outer surface of the drum and ride on rollers that are supported by the foundation.

In use of the furnace, the salt is introduced into the small diameter end of the kiln through a charging opening and a conventional gas or oil fired burner is utilized to heat the salt to the molten state. The aluminum dross and skimmings are then fed into the kiln and melted, with the molten aluminum forming a stratified layer beneath the molten salt. The large diameter end of the kiln is provided with discharge openings through which the molten aluminum and salt can be individually withdrawn.

As the guide rings and drive ring are located on the outer surface of the drum and not attached directly to the kiln or furnace, the rings can be precisely machined to provide concentricity for the drum and the subsequently attached kiln. The improved concentricity of the unit reduces bearing loads and correspondingly reduces bearing maintenance.

As the kiln is tapered, no complicated and expensive tilting mechanism is required to discharge the molten aluminum and salt from the kiln.

As a further advantage, the guide rings and drive rings are not secured directly to the kiln, but are secured to the outer drum which is spaced from the kiln. With this construction, the rings do not restrain thermal expansion of the metal shell of the kiln and thus, there is less deterioration of the refractory kiln lining.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
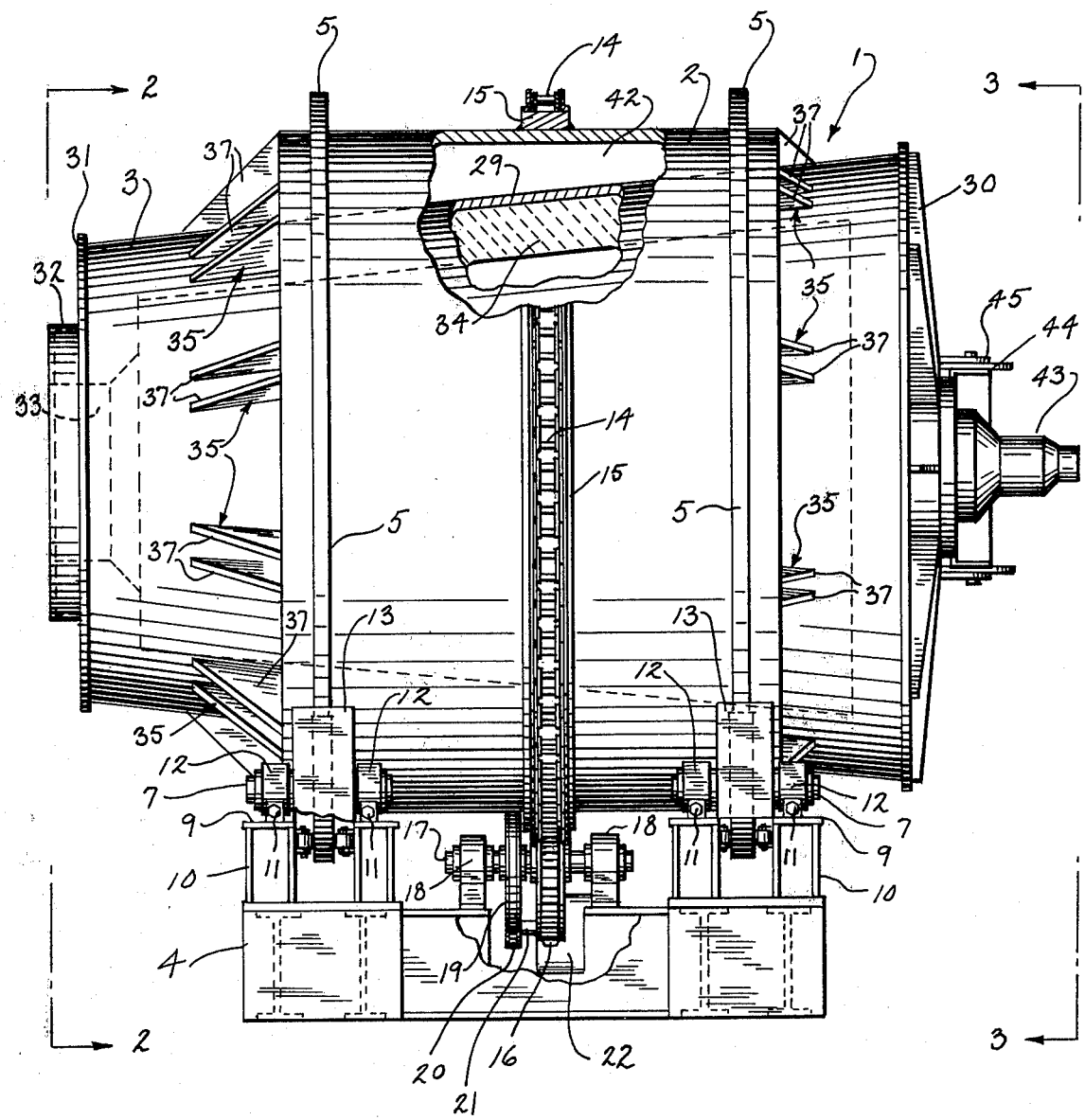
FIG. 1 is a side elevation of the rotary furnace of the invention with parts broken away in section.

The drawings illustrate a rotary furnace that can be used for the melting and recovery of metals, and has particular application for use in an aluminum recovery system. The rotary furnace 1 includes an outer, open-ended, cylinder shell or drum 2, and a tapered refractory lined kiln 3 is spaced inwardly and connected to the drum 2.

The drum 2 and kiln 3 are mounted for rotation with respect to the supporting base 4 by a pair of guide rings 5 that are secured to the outer surface of the drum 2 adjacent the ends of the drum. Each guide ring 5 is mounted to rotate on a pair of rollers 6, and each roller is mounted on a horizontal shaft 7 that is journalled within bearing assemblies 8 mounted on plates 9. The plates 9 are supported through supports 10 from the base 4.

To adjust the position of the support rollers 6, adjusting studs 11 are threaded within lugs 12 secured to plates 9 and bear against the bearing assemblies 8. By threaded adjustment of the studs 11, the position of the bearing assemblies 8 and rollers can be adjusted, as desired.

Suitable guards 13 cover the rollers and prevent objects from being pinched in the nip between the rollers 6 and the guide rings 5.

Figure 2:
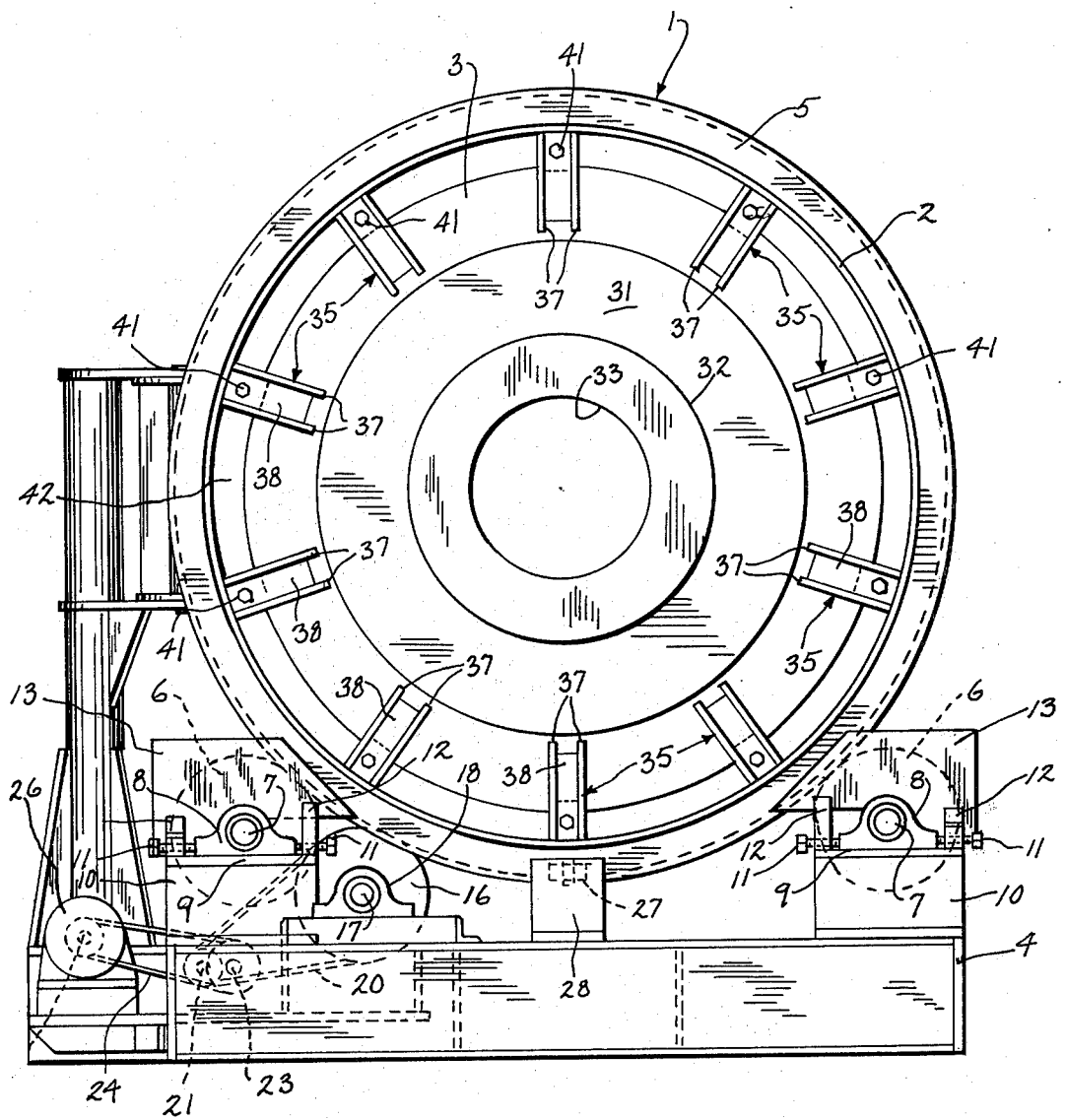
FIG. 2 is an end view of the furnace taken along line 2—2 of FIG. 1.

To drive the drum 2 and kiln 3 about the axis of the drum, a conventional roller chain 14 is secured to drive ring 15 that is located centrally of the length of the drum 2. As best illustrated in FIG. 2, a drive sprocket 16 is engaged with the chain 15 and rotation of the sprocket will drive the chain to rotate the drum about its axis.

Sprocket 16 is mounted on shaft 17 which is journalled within bearing assemblies 18 mounted on the base 4. In addition to sprocket 16, a pulley 19 is secured to the shaft 17 and the pulley is connected by belt 20 to the output shaft 21 of gear reduction box 22. The input shaft 23 of gear reduction box 22 is connected by chain drive 24 to the drive shaft 25 of motor 26. With this drive construction, operation of the motor 26 will drive the sprocket 16 to thereby rotate the drum about its axis, at a speed up to 8 rpm, and normally at a speed of about 3 rpm.

Figure 4:
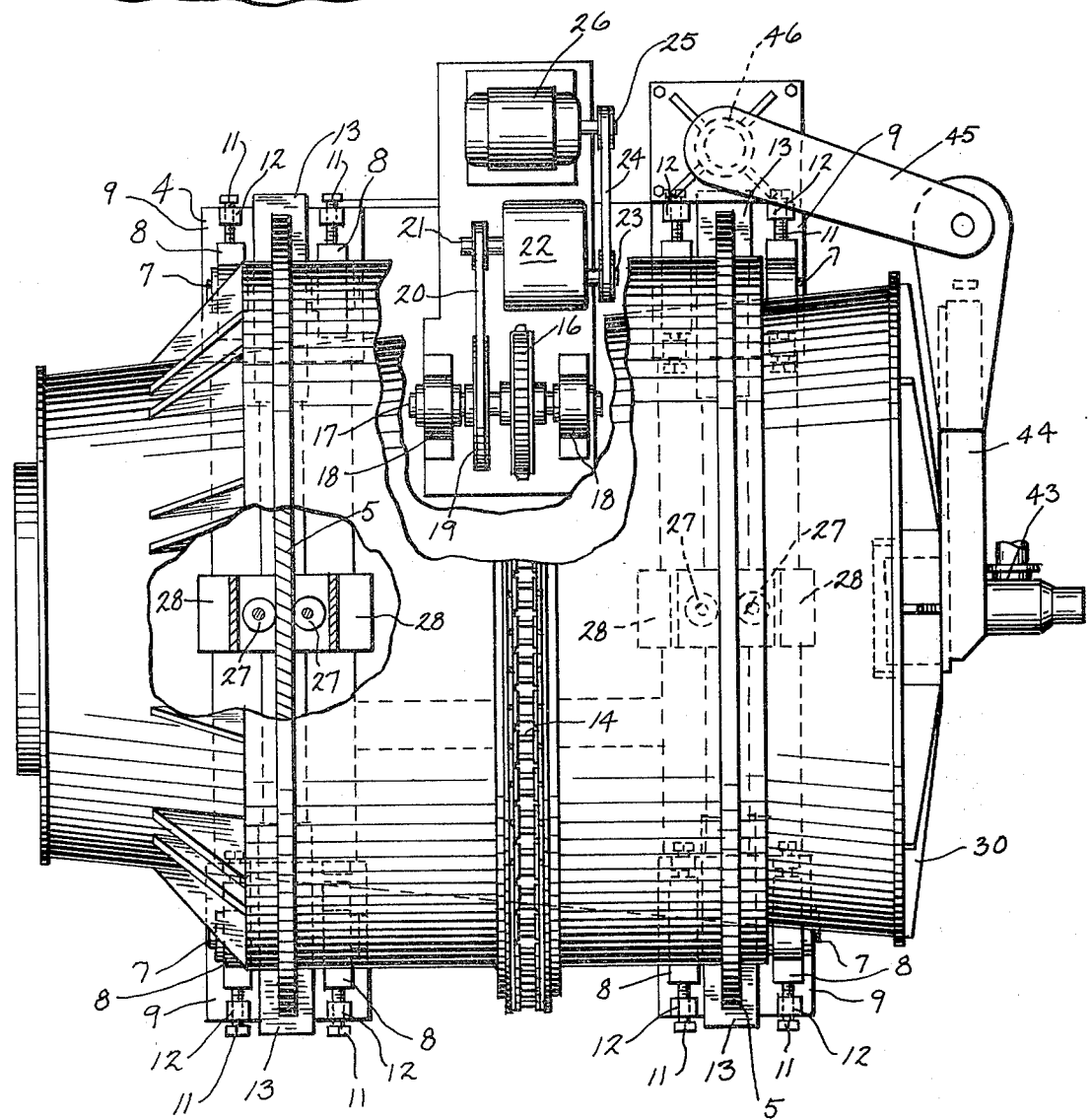
FIG. 4 is a plan view elevation of the furnace with parts broken away.

To prevent longitudinal displacement of the drum 2 and kiln 3, thrust rollers 27 are mounted on brackets 28 and ride against the opposite sides of the guide rings 5, as best illustrated in FIGS. 1 and 4.

The kiln 3 is composed of a tapered metal shell 29, the large diameter end of which is enclosed by a head 30, and the small diameter end is enclosed by head 31. Head 31 is provided with a central opening bordered by flange 32 which defines a charging opening 33 into which the material to be heated is introduced into the kiln. The inner surface of the shell 29, as well as the heads 30 and 31, is lined with a conventional refractory material 34.

Figure 5:
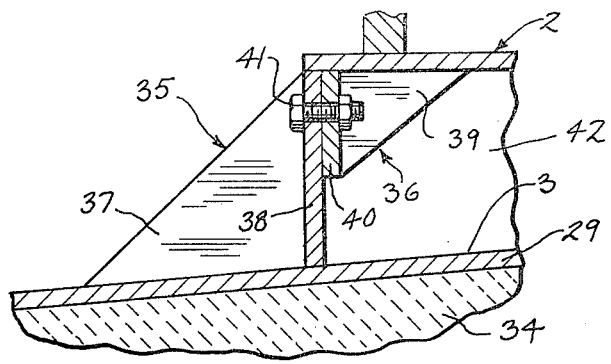
FIG. 5 is an enlarged fragmentary view showing the connection of the tapered kiln to the outer drum.

To support the kiln 3 in spaced relation within the drum 2, a plurality of brackets 35 are secured to the outer surface of the kiln and are connected to corresponding brackets 36 which depend from the drum 9. The connection between the kiln and the drum is best illustrated in FIG. 5. Brackets 35 include parallel side plates 37, which are secured edgewise to the outer surface of the kiln, and a web 38 is secured between the side plates 37. Similarly, each bracket 36 includes a pair of generally triangular side plates 39 connected by a web 40. The webs 38 and 40 are secured in flatwise relation by bolts 41. With this connection, the kiln is secured to, but spaced inwardly of, the drum to provide an annular chamber 42 therebetween.

To heat the materials within the kiln 3, a conventional burner 43 is mounted within an opening in the head 30. Burner 43, which can be gas or oil fired, is mounted on the outer end of an arm 44 which, in turn, is pivotally connected through arm 45 to a vertical pedestal 46. Through this connection, the burner can be withdrawn from the opening in head 30 and moved to a storage or inoperative position.

To discharge the molten aluminum from the kiln, the head 30 is provided with a series of aluminum drain holes which are enclosed by plugs 47. The molten salt is also withdrawn from the head 30 through an opening which is enclosed by a hinged cover or lid 48.

Figure 3:
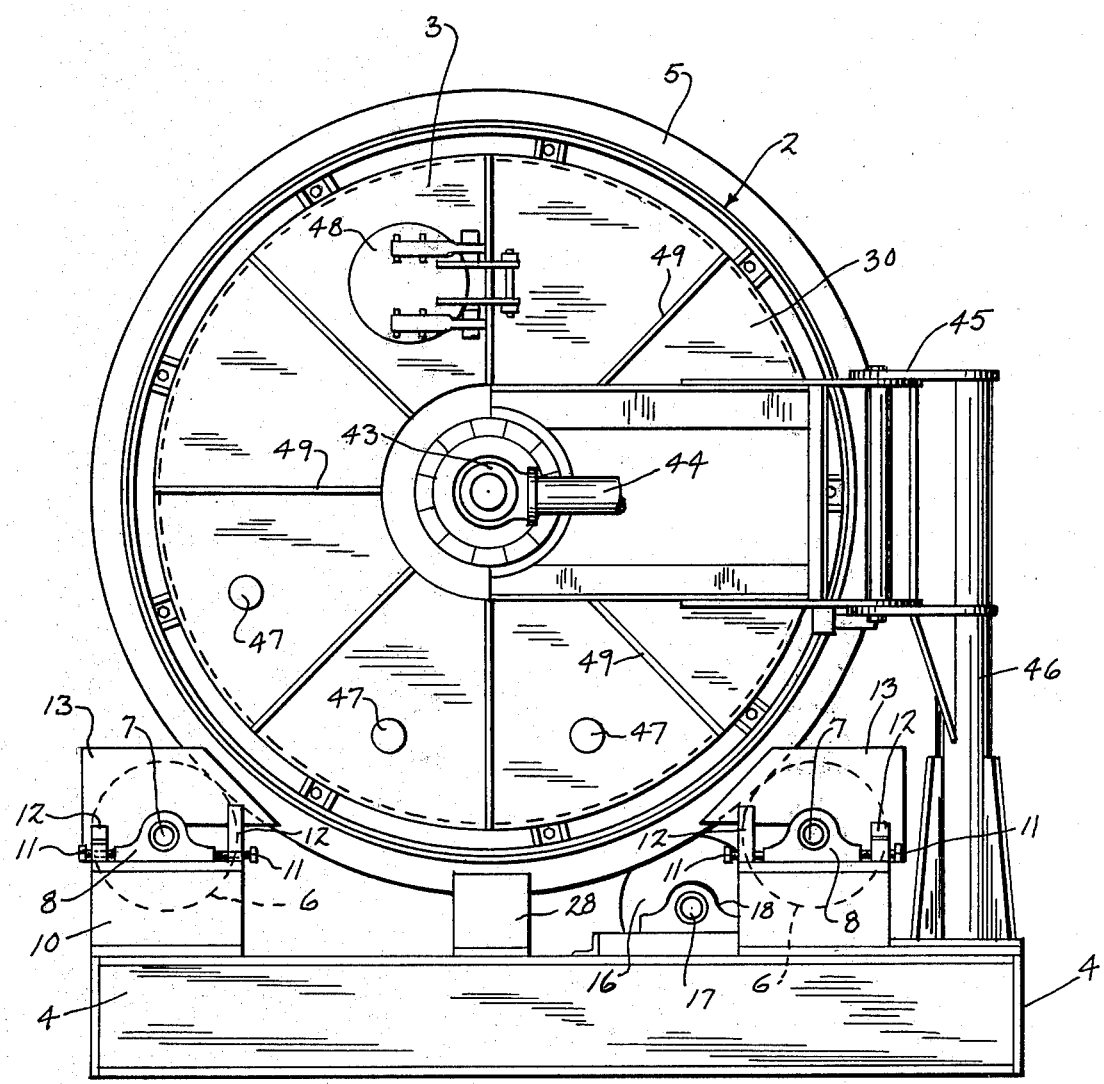
FIG. 3 is an end view of the furnace taken along line 3—3 of FIG. 1.

As shown in FIG. 3, the head 30 is reinforced by a series of radially extending ribs 49.

In operation of the furnace, salt is introduced into the kiln through the charging opening 33 in head 31 and heated by the burner 43 while the drum and kiln are rotated. After the salt has melted, the aluminum dross or skimmings is fed into the kiln through the opening 33 and the aluminum is also melted. The molten aluminum, being heavier than the salt, will stratify as a layer beneath the molten salt, and the molten salt which protects the molten aluminum against oxidation.

Subsequently, rotation of the drum and kiln is stopped with one of the aluminum discharge holes located at the bottom end of the kiln. The plug 47 is removed from the drain hole enabling the molten aluminum to flow by gravity from the unplugged drain hole. After the aluminum is removed, the drum and kiln are again rotated to position the salt tap opening at a level adjacent the level of the salt in the kiln, and the cover 48 is then removed to permit the salt to drain from the kiln. As the salt drains from the kiln, the drum and kiln are rotated to maintain the salt tap opening at a level corresponding to the level of salt in the kiln.

As the guide rings 5 and drive ring 14 are mounted on the outer drum and not on the kiln, the rings can be precisely machined to provide concentricity for the drum and kiln. In addition, the plates 9 which support the bearings are machined so that they lie precisely in a common plane, and this also aids in obtaining concentricity for the unit. By virtue of the improved concentricity, the loads on the bearings are reduced and the energy requirements to rotate the unit are correspondingly decreased.

As the guide rings 5 and drive ring 14 are not attached directly to the kiln, but instead are mounted on the outer drum which is spaced from the kiln, the rings do not restrain thermal expansion of the metal shell 29 of the kiln during the heating operation. As there is no restriction to expansion, the tendency for the refractory lining to deteriorate because of such restriction is eliminated.

As the kiln itself is tapered, the aluminum and salt can be discharged by gravity from the large diameter end of the kiln and no tilting mechanism is required.

Various modes of carrying out the invention are contemplated as being within the scope of the following claims particularly pointing out and distinctly claiming the subject matter which is regarded as the invention.

I claim:

1. A rotary batch-type furnace for melting and recovering metal, comprising an outer cylindrical drum having open ends, guide means for supporting the drum for rotation about its axis, drive means for rotating the drum, a closed kiln disposed within the drum, said kiln being tapered in a longitudinal direction and having a small diameter end and a large diameter end, said kiln having a discharge opening adjacent said large diameter end for removing molten material from the kiln, heating means associated with the kiln for heating materials therein, and connecting means for mounting the kiln in spaced relation within the drum to provide an annular space therebetween.

2. The furnace of claim 1, wherein said guide means includes a pair of guide rings secured to the outer surface of said drum, and said drive means includes a drive ring secured to the outer surface of the drum and located between said guide rings.

3. The furnace of claim 1, and including a refractory lining on the inner surface of said kiln, said refractory lining having a substantially uniform thickness throughout the length of the kiln.

4. The furnace of claim 1, wherein said connecting means comprises a plurality of connecting members disposed at each end of the kiln, the connecting members at each end of said kiln being disposed in circumferential spaced relation.

5. A rotary batch-type furnace for melting and recovering metal, comprising an outer metal cylindrical drum having open opposite ends, a pair of guide rings secured in spaced relation to the outer surface of said drum, means for supporting the guide rings for rotation, a drive ring secured to the outer surface of the drum and located between said guide rings, a drive member operably engaged with the drive ring to rotate the drum about its axis, a kiln having a refractory lining disposed in spaced relation within the drum, said kiln being tapered in a longitudinal direction and having a small diameter end and a large diameter end, said small diameter end having a charging opening for charging material into said kiln and said large diameter end having a discharge opening for discharging molten material from the kiln, closure means for enclosing said openings during periods of rotation of said drum, heating means for heating the material within the kiln, and connecting means for mounting the kiln is spaced relation within the drum to provide an annular space therebetween.

6. The furnace of claim 1, wherein said drive means includes a roller chain disposed in circular configuration and secured in fixed relation to the outer surface of said drum, said drive means also including a drive sprocket engageable with said chain.

7. The furnace of claim 5, wherein said connecting means comprises a plurality of connecting members disposed at each end of the kiln, the connecting members at each end of the kiln being disposed in circumferentially spaced relation.

8. The furnace of claim 5, wherein said support means comprises a pair of rollers to support each guide ring, each roller being supported from a base and said bases being precisely aligned to provide concentricity for said furnace.

9. The furnace of claim 5, and including thrust roller means engageable with opposite sides of at least one of said guide rings to resist axial thrust on said furnace.

10. A rotary furnace for melting and recovering metal, comprising an outer generally cylindrical drum having open ends, guide means for supporting the drum for rotation about its axis, drive means for rotating the drum, a tapered kiln disposed within the drum, heating means associated with the kiln for heating material therein, and connecting means for interconnecting the kiln in spaced fixed relation with the drum to provide a space therebetween, said drive means including a chain disposed in circular configuration and secured in fixed relation to the outer surface of said drum, the inner diameter of said chain being substantially the same as the outer diameter of said drum, said drive means also including a rotatable gear member having a plurality of teeth to engage said chain, whereby rotation of said gear member acts to rotate said drum and kiln about the axis of said drum.

* * * * *